(12) United States Patent
Tsubaki et al.

(10) Patent No.: US 9,048,027 B2
(45) Date of Patent: Jun. 2, 2015

(54) ALUMINUM FOIL FOR ALUMINUM ELECTROLYTIC CAPACITOR ELECTRODE AND METHOD FOR MANUFACTURING THE SAME

(71) Applicant: Panasonic Corporation, Osaka (JP)

(72) Inventors: Masami Tsubaki, Kyoto (JP); Mitsuhisa Yoshimura, Osaka (JP); Hayato Kato, Osaka (JP); Katsuyoshi Shingu, Osaka (JP); Tatsushi Ota, Osaka (JP); Kazuo Fujiwara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 13/966,357

(22) Filed: Aug. 14, 2013

(65) Prior Publication Data

US 2013/0326849 A1   Dec. 12, 2013

Related U.S. Application Data

(62) Division of application No. 12/952,573, filed on Nov. 23, 2010, now abandoned.

(30) Foreign Application Priority Data

Dec. 24, 2009  (JP) ................... 2009-291718
Feb. 15, 2010  (JP) ................... 2010-029773
Feb. 15, 2010  (JP) ................... 2010-029775

(51) Int. Cl.
*H01G 13/00* (2013.01)
*H01G 9/055* (2006.01)
*H01G 9/045* (2006.01)
*C25F 3/04* (2006.01)
*H01G 9/00* (2006.01)

(52) U.S. Cl.
CPC .......... *H01G 13/00* (2013.01); *Y10T 428/12431* (2015.01); *Y10T 29/417* (2015.01); *H01G 9/055* (2013.01); *C25F 3/04* (2013.01); *H01G 9/0029* (2013.01); *H01G 9/045* (2013.01)

(58) Field of Classification Search
CPC ..... H01G 9/0425; H01G 9/055; H01G 9/045; H01G 13/00
See application file for complete search history.

(56) References Cited

U.S. PATENT DOCUMENTS 4,255,247 A     3/1981  Oda et al.
4,786,381 A *  11/1988  Mohr et al. ............. 430/278.1
5,156,723 A * 10/1992  Pliefke et al. ............... 428/687

(Continued)

FOREIGN PATENT DOCUMENTS

JP   06-124855 A   5/1994
JP   10-081945 A   3/1998

(Continued)

*Primary Examiner* — Nicholas A Smith
(74) *Attorney, Agent, or Firm* — Pearne & Gordon LLP

(57) ABSTRACT

A fluid dispersion obtained by mixing oxide particles and water is sprayed to a raw aluminum foil from a direction opposite to a travelling direction of the raw aluminum foil while the raw aluminum foil is allowed to travel. In this way, a roll-pressed mark of the raw aluminum foil is eliminated, and thus aluminum foil for aluminum electrolytic capacitor electrode is produced. Pyramidal-shaped recesses each having an acute angle tip are present all over a surface of the aluminum foil.

10 Claims, 3 Drawing Sheets

(56) References Cited

U.S. PATENT DOCUMENTS

| | | |
|---|---|---|
| 5,435,896 A | 7/1995 | Hardee et al. |
| 6,638,385 B2 * | 10/2003 | Ishikawa et al. .............. 156/182 |
| 7,402,183 B1 * | 7/2008 | Jiang ............................ 29/25.03 |
| 2003/0203171 A1 * | 10/2003 | Higashitani ................... 428/209 |

FOREIGN PATENT DOCUMENTS

| | | |
|---|---|---|
| JP | 2003-229334 A | 8/2003 |
| JP | 2008-231512 A | 10/2008 |

* cited by examiner 10.0μm 10.0μm

US 9,048,027 B2

ALUMINUM FOIL FOR ALUMINUM ELECTROLYTIC CAPACITOR ELECTRODE AND METHOD FOR MANUFACTURING THE SAME

This application is a division of U.S. patent application Ser. No. 12/952,573 filed Nov. 23, 2010 which is incorporated herein by reference in its entirety.

BACKGROUND OF THE INVENTION

1. Field of the Invention

The present invention relates to anode foil used in an aluminum electrolytic capacitor, and particularly relates to aluminum foil used as anode foil of an aluminum electrolytic capacitor for middle to high voltage of 200 V or more and a method for manufacturing the same.

2. Background Art

In recent years, as electronic apparatuses have had a smaller size and higher reliability, makers of electronic apparatuses have strongly required reduction in size of an aluminum electrolytic capacitor. Therefore, electrode foil used in the aluminum electrolytic capacitor is also required to have a larger capacitance per unit area than that of a conventional one.

A general aluminum electrolytic capacitor has a capacitor element formed by winding anode foil and cathode foil with a separator sandwiched therebetween. The anode foil is produced by etching aluminum foil so as to enlarge an effective surface area, and forming a dielectric oxide film on the surface of the aluminum foil by anodic oxidation. The cathode foil is produced by etching aluminum foil so as to enlarge an effective surface area. The aluminum electrolytic capacitor is formed by impregnating the capacitor element with an electrolytic solution, and sealing the capacitor element in a metal case.

In order to enhance a capacitance or to reduce the size in an aluminum electrolytic capacitor, it is essential to enlarge an effective surface area of anode foil and to enhance a capacitance per unit area. Therefore, techniques for etching and forming treatment to enlarge the effective surface area of anode foil are being developed actively.

In general, aluminum foil used to produce anode foil is chemically or electrochemically etched in a hydrochloric acid aqueous solution containing acids for forming a film, for example, sulfuric acid, nitric acid, phosphoric acid, and oxalic acid. In particular, an etching treatment method for aluminum foil used at middle to high voltage includes a preceding-stage etching step and a subsequent-stage etching step. In the preceding-stage etching step, basically, tunnel-shaped pits (hereinafter, simply referred to as "pits") are formed. In the subsequent-stage etching step, each of the pits is enlarged so as to have a diameter suitable for a voltage at which an aluminum electrolytic capacitor is used. In this treatment method, it is important how the many pits are generated and how efficiently the pits are enlarged.

In such an etching treatment method for aluminum foil used at middle to high voltage, techniques for efficiently forming pits are roughly classified into a surface modification technique and an etching treatment technique of aluminum foil.

As the surface modification technique of aluminum foil, it is generally known that the ratio of crystals occupied in the Miller index (100) plane of aluminum foil is made to be 80% or more (see, for example, Japanese Patent Unexamined Publication No. H10-81945).

Furthermore, Japanese Patent Unexamined Publication No. H6-124855 proposes a technique of allowing one or more kinds from Pb, In, and Sn to be present in an amount of 100 to 5000 ppm in total in a surface layer part from the surface to a depth of 0.1 µm of aluminum foil of an electrolytic capacitor, and to be contained in an amount of 1 to 5 ppm in total in the inside part excluding the surface layer part. This technique aims to form a large number etching pits efficiently by allowing the etching to proceed to the inside of the aluminum foil with the surface dissolution of the aluminum foil suppressed. As a result, it is mentioned that the area enlargement ratio is increased and the capacitance can be increased.

In addition, Japanese Patent Unexamined Publication No. 2003-229334 proposes a technique for uniformly providing carbon on aluminum foil by, for example, vapor deposition, and then giving energy to react aluminum with carbon so as to form $Al_4C_3$ particles. This technique aims to disperse and distribute appropriate number of etching pits uniformly from the introduced $Al_4C_3$ as a starting point of an initial pit and by preventing the starting point from dropping off. As a result, it is mentioned that an electrolytic capacitor with a large capacitance can be obtained.

However, in these surface modification techniques, even if Pb and $Al_4C_3$ are attached, the capacitance is not so enhanced. This is because concavity and convexity of damages formed by being roll-pressed (hereinafter referred to as "roll-pressed damage") remain, which are generated on the aluminum foil surface when an aluminum material is roll-pressed. Pits are surely generated from a portion to which Pb and $Al_4C_3$ are attached, but pits are also generated from the concavity and convexity of the roll-pressed damage. Therefore, pits are further generated to link a plurality of pits, which have been generated uniformly, to each other. As a result, the number of pits is reduced. That is to say, joining of pits occurs.

Furthermore, Pb and the like are concentrated in the vicinity of the surface, and particularly in a roll-pressed mark. Pits are easily generated from the positions of the concentrated Pb. Therefore, pits are generated in a narrow range so that they are overlapped with each other. As a result, joining of pits occurs.

Furthermore, Japanese Patent Unexamined Publication No. 2008-231512 proposes a technique of forming a metal layer having a plurality of crater-shaped recesses and made of at least one selected from the group consisting of Cu, Ni, Co, Fe, Mn, Mg, Zn, Pb, Bi, In, Sn, and Sb on the surface of the recesses. It is mentioned that by making the average size of the opening of the plurality of crater-shaped recesses in the range of 0.05 µm to 5 µm, a high capacitance can be exhibited when etching is carried out.

However, in order to form the craters, it is necessary to form a porous oxidized film by carrying out anodic oxidation treatment and to remove the porous oxidized film. In this technique, since a metal layer is formed on aluminum foil by, for example, vapor deposition, the steps are complicated. Therefore, this technique is not suitable for practical use.

SUMMARY OF THE INVENTION

The present invention is aluminum foil used at middle to high voltage suitable for improving a pit density and a pit dispersibility by etching treatment and a method for manufacturing the same. By etching the aluminum foil, it is possible to produce anode foil for an aluminum electrolytic capacitor having a large capacitance.

In the method for manufacturing the aluminum foil used at middle to high voltage of the present invention, raw aluminum foil having a roll-pressed mark is allowed to travel continuously, and a fluid dispersion obtained by mixing oxide particles and water is sprayed to the raw aluminum foil from a direction opposite to the travelling direction of the raw aluminum foil. This treatment eliminates the roll-pressed mark of the raw aluminum foil, and forms recesses all over the surface of the raw aluminum foil so as to enlarge the surface area. According to such a method, collision impact of oxide particles with respect to the travelling speed of the raw aluminum foil is increased, and the roll-pressed mark of the raw aluminum foil can be efficiently eliminated. Then, with the following direct-current etching treatment, pits are generated from the recesses as the starting points, the dispersibility of the generated pits is uniform, and pits are not joined with each other. Thus, etching can be carried out efficiently. As a result, the capacitance can be increased.

DETAILED DESCRIPTION OF THE INVENTION

Hereinafter, an embodiment of the present invention is described with reference to drawings. In the following description, foil obtained by roll-pressing an aluminum material is referred to as "raw aluminum foil", and foil obtained by allowing oxide particles to collide with the raw aluminum foil is referred to as "aluminum foil". Foil obtained by etching the aluminum foil to enlarge the effective surface area is referred to as "etched foil", and foil obtained by subjecting the etched foil to forming treatment is referred to as "forming treated foil". This forming treated foil is called anode foil when it is used in an aluminum electrolytic capacitor. The anode foil and cathode foil are collectively called electrode foil.

Figure 1:
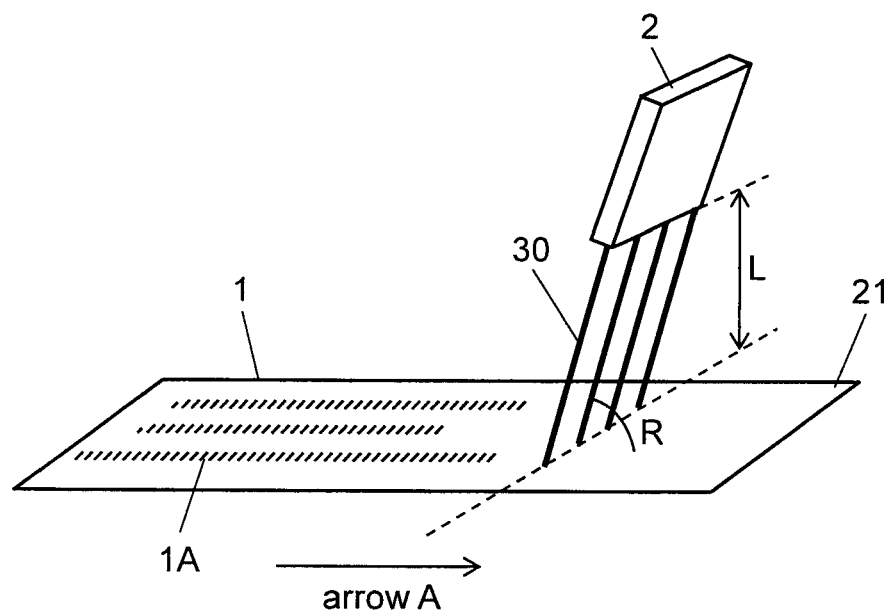
FIG. 1 is a view showing a concept of a method for manufacturing aluminum foil in accordance with an embodiment of the present invention.

FIG. 1 is a conceptual view showing a state in which a fluid dispersion obtained by mixing oxide particles and water is injected to raw aluminum foil in accordance with an embodiment of the present invention. Raw aluminum foil 1 is produced by roll-pressing an aluminum material, and then heat-treating thereof. With this heat treatment, the ratio of crystals occupied in a Miller index (100) plane is 80% or more. The treated aluminum foil is generally called aluminum foil for middle to high voltage, which has roll-pressed mark 1A and roll-pressing oil (not shown) on its surface.

In this embodiment, fluid dispersion 30 obtained by mixing oxide particles and water is sprayed from nozzle 2 from the direction opposite to the travelling direction of raw aluminum foil 1 (arrow A). Nozzle 2 has a plurality of injection holes (not shown) in the width direction of raw aluminum foil 1. With this treatment, roll-pressed mark 1A on raw aluminum foil 1 can be eliminated, and a large number of pyramidal-shaped recesses (having a shape of three or more sided pyramid) having an acute angle tip are formed all over the surface of raw aluminum foil 1. Such wet blasting treatment makes it possible to produce aluminum foil 21 whose surface area is enlarged.

It is preferable to use polyhedral particles having an acute angle as the oxide particle. Thus, as mentioned above, it is possible to reliability form the pyramidal-shaped recesses having an acute angle tip.

Furthermore, when fluid dispersion 30 is obliquely sprayed against the surface of raw aluminum foil 1, the oxide particles are prevented from sinking in raw aluminum foil 1. The tip portions of the oxide particles collide with the surface of raw aluminum foil 1, so that roll-pressed mark 1A on the surface of raw aluminum foil 1 can be eliminated. Then, a large number of pyramidal-shaped recesses each having an acute angle tip and having a depth of up to 10 μm are formed in the surface layer of raw aluminum foil 1.

That is to say, it is preferable that nozzle 2 is disposed at angle R that is less than 90° with respect to the surface of raw aluminum foil 1. Furthermore, it is preferable that angle R is 45° or more and less than 90°. When angle R is less than 45°, the impact of the oxide particles with respect to raw aluminum foil 1 is weak, so that roll-pressed mark 1A cannot be eliminated efficiently. Furthermore, when angle R is 90° or more, since fluid dispersion 30 is sprayed in the same direction as the travelling direction of raw aluminum foil 1, the oxide particles may follow the surface of raw aluminum foil 1. Consequently, unevenness in eliminating roll-pressed mark 1A occurs, thus making the subsequent generation of pits by direct current etching treatment nonuniform.

The oxide particles sprayed from nozzle 2 are spread to some extent in the width direction. Therefore, it is preferable that distance L between raw aluminum foil 1 to nozzle 2 is adjusted so that 70% or more of the sprayed oxide particles in total amount is sprayed in the direction opposite to the travelling direction of raw aluminum foil 1.

Figure 2:
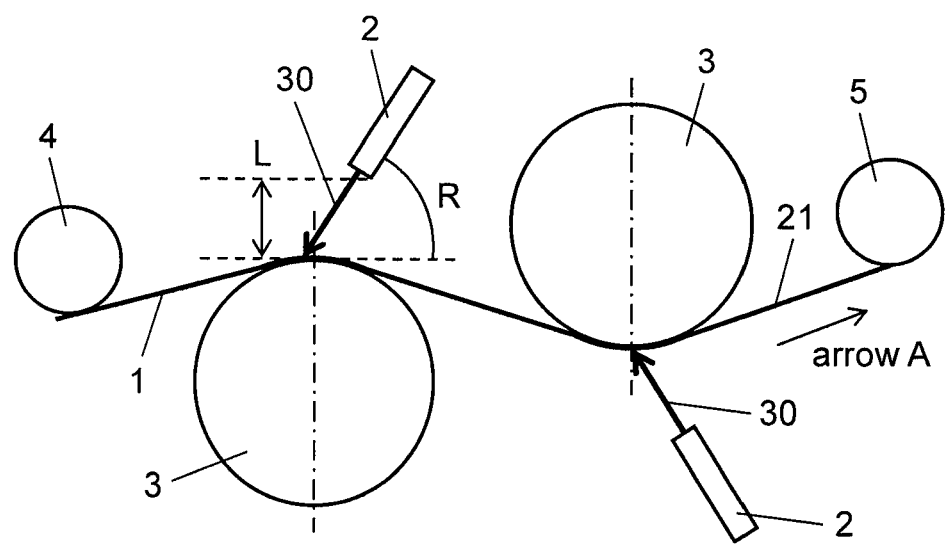
FIG. 2 is a schematic diagram showing a travelling state of raw aluminum foil in accordance with the embodiment of the present invention.

A configuration in which such wet blasting treatment is carried out continuously is described with reference to FIG. 2. FIG. 2 is a schematic diagram showing a travelling state of raw aluminum foil 1 in accordance with this embodiment. From wind-off part 4, raw aluminum foil 1 passes through travelling roller 3 and is wound up by wind-up part 5. That is to say, travelling rollers 3 for allowing raw aluminum foil 1 to travel are disposed between wind-off part 4 and wind-up part 5. Travelling rollers 3 are respectively disposed on the front and rear surfaces of raw aluminum foil 1, so that travelling rollers 3 apply a tensile force to raw aluminum foil 1.

In a portion in which raw aluminum foil 1 is brought into contact with travelling roller 3, fluid dispersion 30 obtained by mixing oxide particles and water is injected from nozzle 2 to raw aluminum foil 1. At this time, fluid dispersion 30 is sprayed from the direction opposite to the travelling direction (arrow A) of raw aluminum foil 1.

By spraying fluid dispersion 30 obtained by mixing oxide particles and water to raw aluminum foil 1 in the position in which raw aluminum foil 1 is brought into contact with travelling roller 3, waviness and wrinkles of raw aluminum foil 1 are suppressed. Thus, the spraying efficiency can be improved.

Angle R of nozzle 2 is adjusted according to the travelling speed of raw aluminum foil 1. When the travelling speed is slow, angle R may be nearer to 90°. On the other hand, when the travelling speed is fast, angle R is preferably nearer to 45°. Furthermore, the mixing ratio of oxide particles and water, spraying pressure, and spraying distance L are appropriately set according to the travelling speed.

It is preferable that the average particle diameter of the oxide particles is 5 to 15 μm. As mentioned above, it is preferable that each of the oxide particles has a polyhedral shape with an acute angle and appropriate toughness. By spraying fluid dispersion 30 at a high pressure, the roll-pressing oil and roll-pressed mark 1A is eliminated, so that a large number of pyramidal-shaped recesses each having an acute angle at least at a tip can be formed on the surface of aluminum foil 21.

Figure 3A:
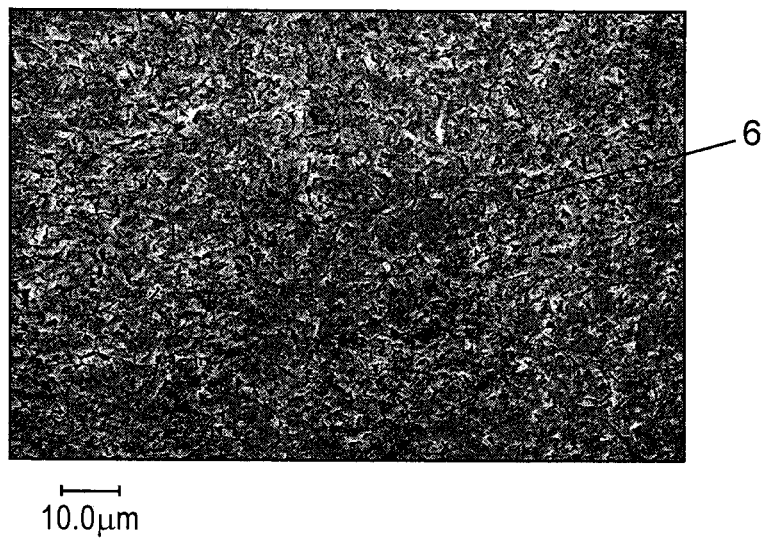
FIG. 3A shows a surface SEM image of aluminum foil in accordance with the embodiment of the present invention.
Figure 3B:
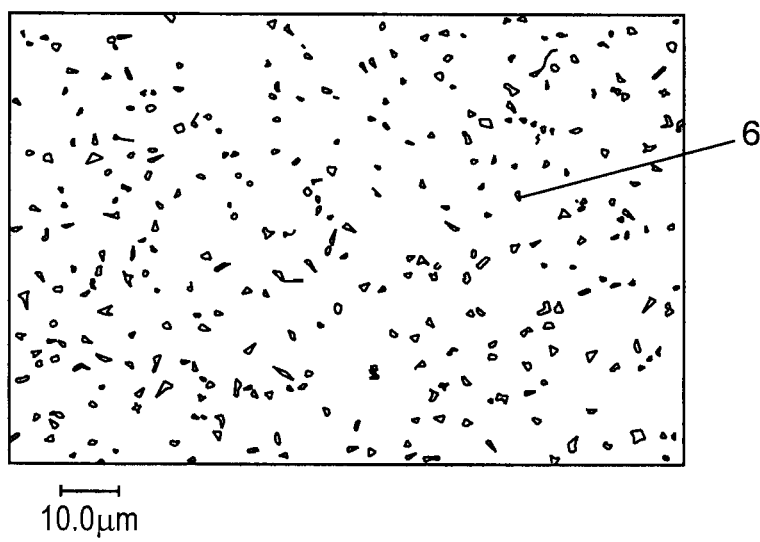
FIG. 3B is a schematic view of FIG. 3A.

FIG. 3A shows a surface SEM image of aluminum foil 21 in accordance with this embodiment; and FIG. 3B is a schematic view of FIG. 3A. A large number of pyramidal-shaped recesses 6 having an acute angle are observed on the surface of aluminum foil 21. Recess 6 has a length of 0.5 to 15 μm and a depth of 15 μm or less. It is preferable that such recesses 6 are present at 500 points/mm$^2$ or more and 2000 points/mm$^2$ or less. By providing recesses 6 in this range, the capacitance can be enhanced.

When a capacitance of raw aluminum foil 1 that has not undergone physical treatment is measured by a testing method standardized by Electronic Industries Association of Japan (EIAJ), it is usually about 3.6 μF/cm$^2$. After fluid dispersion 30 obtained by mixing oxide particles and water is sprayed to raw aluminum foil 1, the surface area of aluminum foil 21 is enlarged and its capacitance is increased. When the capacitance of aluminum foil 21 is made to be 1.19 times or more as that of raw aluminum foil 1, the capacitance after the subsequent direct current etching treatment can be enhanced. That is to say, it is preferable that the capacitance of aluminum foil 21 is made to be 4.28 μF/cm$^2$ or more.

As mentioned above, the capacitance is measured according to a testing method for the capacitance of forming treated anode foil for middle to high voltage in a testing method for electrode foil for an aluminum electrolytic capacitor of EIAJ standard (RC-2364A). Herein, the above-mentioned testing method is described briefly. A test piece has a size of 10 mm×50 mm. Firstly, an aqueous solution obtained by dissolving 80 g of ammonium pentaborate in one liter of pure water is put in a testing chamber made of glass, and the test piece and a counter electrode are immersed in this aqueous solution. The test piece is completely immersed in an aqueous solution. For the counter electrode, etched aluminum foil or a platinum plate having a capacitance of 40000 μF or more is used. In this state, the temperature of the aqueous solution is kept at 30° C. and the capacitance of the test piece is measured by using a capacitance meter.

As mentioned above, in this embodiment, raw aluminum foil 1 having roll-pressed mark 1A is allowed to travel, and fluid dispersion 30 obtained by mixing oxide particles and water is sprayed to raw aluminum foil 1 from the direction opposite to the travelling direction of raw aluminum foil 1. With this treatment, the collision impact of the oxide particles is increased according to the travelling speed of raw aluminum foil 1, so that roll-pressed mark 1A can be eliminated efficiently and the concentration of impurities of raw aluminum foil 1 can be alleviated. Moreover, it is possible to enlarge the surface area by forming a large number of recesses 6 on raw aluminum foil 1.

Then, with the subsequent direct-current etching treatment, pits are generated from recesses 6, and the duplicate formation of pits is alleviated so as to improve the dispersibility. Therefore, joining of pits does not occur, and the direct-current etching can be carried out efficiently. As a result, the capacitance of the aluminum anode foil can be improved.

Furthermore, since fluid dispersion 30 obtained by mixing oxide particles and water is sprayed, scattering of oxide particles has less influence on the other places when spraying. Therefore, it is possible to form a large number of pyramidal-shaped recesses 6 having an acute angle tip on the surface of raw aluminum foil 1 such that they are formed in a part from the surface to a depth of 15 μm of raw aluminum foil 1. As a result, aluminum foil 21 whose surface area is enlarged can be produced.

Furthermore, since a tensile force is applied to raw aluminum foil 1 by travelling roller 3, waviness and wrinkles of raw aluminum foil 1 can be suppressed and the spraying efficiency can be further improved.

The formation of recesses having a depth of more than 15 μm from the surface of raw aluminum foil 1 makes it difficult to generate pits from the deep position. Therefore, it is not preferable because an effect of improving dispersibility is reduced.

It is more preferable that recesses 6 are formed in a part from the surface to a depth of 10 μm of raw aluminum foil 1. This improves the dispersibility of pits by the below-mentioned direct-current etching treatment, and pits can be formed uniformly.

By allowing oxide particles to collide with raw aluminum foil 1, roll-pressed mark 1A can be eliminated from raw aluminum foil 1. Although roll-pressed mark 1A may remain such that thin roll-pressed mark 1A is visually observed, they do not affect the generation of pits by the etching treatment.

Figure 4:
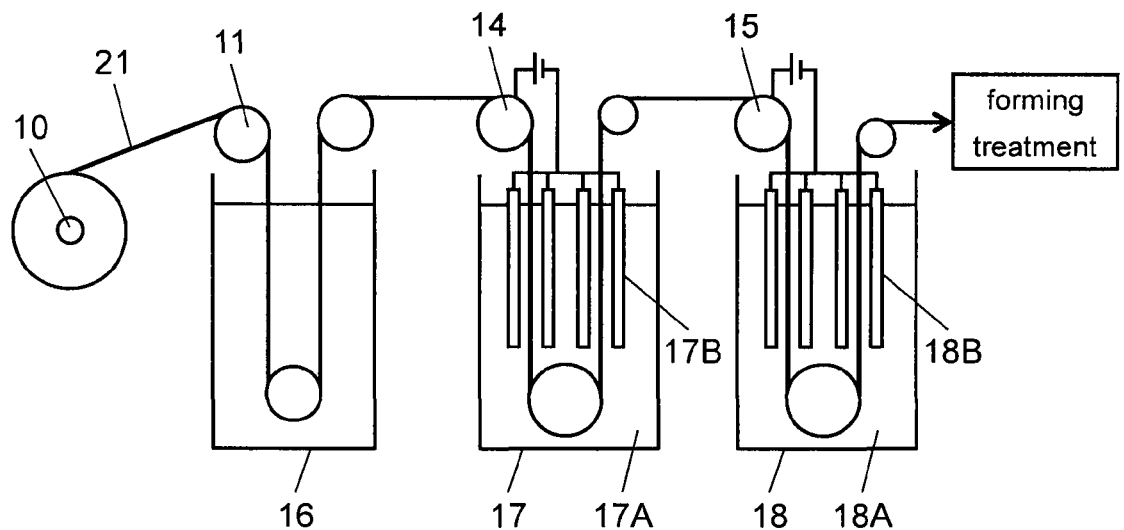
FIG. 4 is a schematic diagram showing an apparatus for direct current etching treatment of aluminum foil in accordance with the embodiment of the present invention.

Next, the direct-current etching treatment is described with reference to FIG. 4. FIG. 4 is a schematic diagram showing an apparatus for direct-current etching treatment of aluminum foil in accordance with this embodiment. This apparatus includes pretreatment part 16, preceding-stage etching part 17 and subsequent-stage etching part 18, and continuously carries out etching treatment of aluminum foil 21 via a plurality of rollers 11 to 15.

Herein, it is preferable that first roller 11 for carrying out direct-current etching treatment has a diameter of 30 mm or more. That is to say, it is preferable that the diameter of first roller 11 of pretreatment part 16 is 30 mm or more.

In the direct-current etching treatment, when a roller with a small curvature is used, recesses 6 generated by spraying oxide particles are deformed, and thus the effect of dispersibility of pits is reduced. Therefore, it is preferable that the diameter of first roller 11 is made to be 30 mm or more. This makes it possible to minimize cracks generated between recesses 6 formed in raw aluminum foil 1 and the dispersibility of pits can be further enhanced.

Although it is preferable that each of all the plurality of rollers for allowing aluminum foil 21 to continuously travel have a diameter of 30 mm or more, it is preferable that at least each of the first rollers for allowing aluminum foil 21 to travel into each chamber of the direct-current etching treatment has a diameter of 30 mm or more. That is to say, it is preferable that roller 14 as the first roller of preceding-stage etching part 17 and roller 15 as the first roller of subsequent-stage etching part 18 have a diameter of 30 mm or more. The reason for this is the same as the above.

FIG. 4 shows a state in which aluminum foil 21 to which oxide particles are sprayed is wound up in wind-off part 10. However, a step of spraying fluid dispersion 30 to raw aluminum foil 1 and a step of direct-current etching may be carried out continuously.

It is preferable that aluminum foil 21 is pretreated with an acidic solution in pretreatment part 16 before preceding-stage etching is carried out. With the pretreatment, a small oxide film generated in the process of collision of fluid dispersion 30 can be removed, and a small amount of remaining roll-pressed mark 1A can be dissolved. Therefore, an effect of the dispersibility of pits can be further enhanced.

Figure 5:
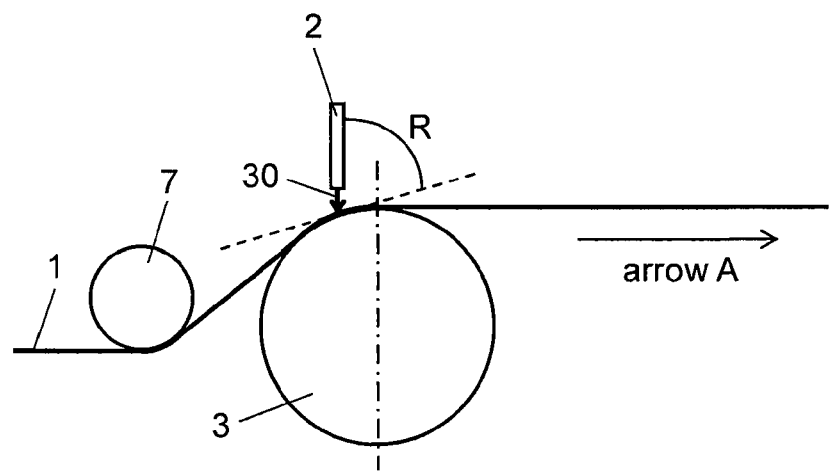
FIG. 5 is a schematic diagram showing another travelling state of raw aluminum foil in accordance with the embodiment of the present invention.

Next, a more preferable configuration of an apparatus for carrying out wet blasting treatment is described with reference to FIG. 5. FIG. 5 is a schematic diagram showing another travelling state of raw aluminum foil in accordance with this embodiment of the present invention.

As compared with the configuration shown in FIG. 2, this configuration includes tension roller 7 disposed before travelling roller 3. That is to say, in the arrangement that raw aluminum foil 1 from wind-off part 4 passes through via travelling roller 3, and is wound up by wind-up part 5, tension roller 7 is disposed before travelling roller 3. Tension roller 7 applies a tensile force to raw aluminum foil 1, and thereby waviness and wrinkles of raw aluminum foil 1 are suppressed and the efficiency of spraying fluid dispersion 30 can be improved. Thus, the productivity can be enhanced.

Nozzle 2 is disposed at the upstream side of a vertical center line of travelling roller 3, and a spraying part of nozzle 2 is directed immediately below (in the vertical direction). Nozzle 2 sprays fluid dispersion 30 to a part in which raw aluminum foil 1 is brought into contact with travelling roller 3.

With such an arrangement, it is not necessary to adjust an angle of nozzle 2. It is possible to easily set appropriate spraying conditions only by controlling the travelling speed of raw aluminum foil 1 and a position to which tension roller 7 is attached.

Hereinafter, specific Examples of this embodiment are described. In the below description, for raw aluminum foil 1, anode foil for an aluminum electrolytic capacitor (for high voltage) (product name: CH99) produced by SHOWA DENKO K.K. is used.

(Study of Travelling Speed of Raw Aluminum Foil 1 and Angle R of Nozzle 2)

Firstly, results of the study of the travelling speed of raw aluminum foil 1 and angle R of nozzle 2 are described. In this study, raw aluminum foil 1 having a thickness of 115 μm is used. Raw aluminum foil 1 having such a thickness is subjected to wet blasting treatment by using an apparatus shown in FIG. 2 in a state in which the travelling speed is set to three states: 2.8, 5.2, and 7.2 m/min and angle R of nozzle 2 is set to five states: 45, 60, 75, 90, and 105°. Then, aluminum foil 21 after treatment is subjected to direct-current etching treatment by using an apparatus shown in FIG. 4 including roller 11 having a diameter of 30 mm.

For the oxide particles, a ceramic abrasive (White Alundum, size: #2000) produced by Fuji Manufacturing Co., Ltd. is used. The mixing ratio by weight of oxide particles and water is made to be 14/86. Furthermore, the spraying pressure is 0.1 MPa, and distance L between raw aluminum foil 1 and a spray port is 20 mm.

Note here that White Alundum is high purity alumina having an aluminum content of 99.7% or more and having Mohs hardness of 12. It is little bit harder than iron-containing Alundum and is generally used as an abrasive for sandblasting or cutting. The particle shape is a square-cornered and #2000 has an average particle diameter of 6.7±0.6 μm.

The direct-current etching treatment is carried out as follows. Firstly, in pretreatment part 16, aluminum foil 21 is immersed in a hydrochloric acid aqueous solution with concentration of 30 g/l at 80° C. for 90 seconds.

In preceding-stage etching part 17, etchant 17A obtained by dissolving aluminum in a mixed aqueous solution of hydrochloric acid, sulfuric acid, and phosphoric acid is used. The blending amounts of hydrochloric acid, sulfuric acid, phosphoric acid and aluminum are 30 g, 300 g, 0.5 g, and 12 g per one liter of etchant 17A, respectively. Furthermore, the liquid temperature is 75° C. Then, counter electrode 17B is disposed in etchant 17A, and aluminum foil 21 as an anode is subjected to direct-current etching treatment and washed with water. The electric current density of the direct-current etching treatment is 1.0 A/cm$^2$ and the treatment time is 30 seconds.

Subsequently, in subsequent-stage etching part 18, in etchant 18A at 70° C. obtained by adding 0.5% boric acid into 5% nitric acid solution, counter electrode 18B is disposed, aluminum foil 21 as an anode is subjected to direct-current etching treatment and washed with water. The electric current density of the direct-current etching treatment is 0.1 A/cm$^2$ and treatment time is 10 minutes. Finally, dechloridation is carried out so as to produce etched foil. Subsequently, the etched foil is subjected to the usually used forming treatment (500 V) to produce forming treated foil.

For comparison, etched foil is produced by subjecting the above-mentioned raw aluminum foil 1 to direct-current etching treatment as mentioned above without carrying out wet blasting treatment. Similarly, this etched foil is subjected to forming treatment.

The measurement results of the capacitance and bending strength of the thus produced various forming treated foil are shown in Table 1. The bending strength is evaluated by bending a test piece around a rod having a diameter of 1.0 mm under the conditions of load of 250 g and bending angle of 90°, and returning it to the original state. In Table 1, one reciprocating motion is counted as one time.

TABLE 1

| State of aluminum foil | | Properties of forming treated foil | |
|---|---|---|---|
| Traveling speed (m/min) | Angle R of nozzle (°) | Capacitance ratio | Bending strength (number of times) |
| 2.8 | 95 | 102.1 | 64 |
|  | 85 | 105.8 | 61 |
|  | 75 | 108.2 | 62 |
|  | 60 | 106.8 | 63 |
|  | 45 | 105.8 | 64 |
|  | 40 | 103.2 | 65 |
| 5.2 | 95 | 103.3 | 64 |
|  | 85 | 109.5 | 63 |
|  | 75 | 110.2 | 59 |
|  | 60 | 106.3 | 62 |
|  | 45 | 105.1 | 69 |
|  | 40 | 103.5 | 68 |
| 7.2 | 95 | 102.2 | 63 |
|  | 85 | 109.2 | 63 |
|  | 75 | 110.8 | 59 |
|  | 60 | 105.9 | 66 |
|  | 45 | 105.4 | 67 |
|  | 40 | 103.1 | 69 |
| Wet blasting is not carried out | | 100 | 55 |

As is apparent from Table 1, when angle R of nozzle 2 is 45° or more and 85° or less, the capacitance of the etched foil is remarkably improved as compared with that in the case in which wet blasting treatment is not carried out. Furthermore, the capacitance is further increased when fluid dispersion 30 is allowed to collide with raw aluminum foil 1 from the direction opposite to the traveling direction of raw aluminum foil 1, that is, in the direction in which R is less than 90°.

Although it is preferable that the travelling speed is 2.8 m/min or more, even when the travelling speed is increased to 7.2 m/min, the improvement of the capacitance cannot be further enhanced. However, the productivity can be enhanced.

(Study of Diameter of Roller 11)

Aluminum foil 21 is produced in the conditions that angle R of nozzle 2 is 60°, the travelling speed of raw aluminum foil 1 is 5.2 m/min, and the mixing ratio and the spraying pressure of fluid dispersion 30 and distance L are the same conditions as mentioned above. Then, by using the apparatus shown in FIG. 4, aluminum foil 21 is subjected to direct-current etching treatment. At the time, the results when rollers 11 have diameters of 10, 15, 20, 30, 40, 90, 110, 130, and 250 mm are shown in Table 2.

For comparison, etched foil is produced by subjecting the above-mentioned raw aluminum foil 1 to direct-current etching treatment as mentioned above without carrying out wet blasting treatment. At this time, for roller 11, a roller having a diameter of 250 mm is used. This etched foil is similarly subjected to forming treatment.

TABLE 2

| Diameter of roller (mm) | Capacitance ratio | Bending strength (number of time) |
|---|---|---|
| 10 | 101.1 | 58 |
| 15 | 101.9 | 56 |
| 20 | 103.3 | 60 |
| 30 | 106.4 | 61 |
| 40 | 107.2 | 60 |
| 90 | 109.0 | 59 |
| 110 | 109.9 | 59 |
| 130 | 110.1 | 60 |
| 250 | 110.2 | 59 |
| 250 (Wet blasting is not carried out) | 100 | 54 |

As is apparent from Table 2, when the diameter of a roller for allowing aluminum foil 21 to travel in direct-current etching treatment is 10 mm or more, the capacitance is larger as compared with the case without carrying out wet blasting treatment. Although the roller diameter may be 200 mm or more, even if the roller diameter is made to be 250 mm, the capacitance is not so large. Furthermore, when the diameter of roller 11 is large, etching equipment becomes larger and the equipment cost rises. On the other hand, even if the diameter of roller 11 is less than 30 mm, the capacitance becomes larger to some extent. However, other problems such as wrinkles, meandering during travelling, short-circuit to the cathode plate may occur. Therefore, it is industrially preferable that the diameter is 30 mm or more and 250 mm or less.

(Study of Capacitance of Aluminum Foil)

Next, results of the study of capacitance of the aluminum foil 21 that has been subjected to wet blasting treatment are described.

As raw aluminum foil 1, the above-mentioned anode foil for an aluminum electrolytic capacitor (for high voltage) is used. However, in this study, a material having a thickness of 105 μm is used. By allowing oxide particles to collide with raw aluminum foil 1, as shown in Table 3, ten types of aluminum foil 21 having different capacitances of 15.48 to 4.10 μF/cm$^2$ are produced. At this time, the oxide particle to be used is the above-mentioned White Alundum (size: #2000). However, the mixture ratio by weight of the oxide particles and water is made to be 50/50. By adjusting the travelling speed of raw aluminum foil 1 and the conditions of collision (distance L and spraying pressure) of oxide particles, the capacitance of aluminum foil 21 is changed.

The thus produced aluminum foil 21 is further subjected to etching treatment and forming treatment. The conditions are the same as those mentioned above. Note here that etching treatment and forming treatment are also carried out to raw aluminum foil 1 that has not been subjected to wet blasting treatment.

The capacitance ratio and the bending strength of the thus produced forming treated foil, as well as the capacitance and L-value of Hunter Lab color system of aluminum foil 21 before etching are shown in Table 3. The capacitance and the bending strength are measured as mentioned above. Note here that the Hunter Lab color system is a color system proposed by R. S. Hunter in which L-value represents lightness. The L-value is measured by using a general measurement apparatus, a multi-angle colorimeter (product number: H-MAC) produced by Suga Test Instruments Co., Ltd. is used.

TABLE 3

| State of aluminum foil | | | Properties of forming treated foil | |
|---|---|---|---|---|
| Capacitance (μF/cm$^2$) | Area enlargement ratio | L-value | Capacitance ratio | Bending strength (number of times) |
| 15.48 | 4.3 | 49 | 103.2 | 60 |
| 12.60 | 3.5 | 50 | 105.8 | 61 |
| 11.20 | 3.11 | 55 | 107.2 | 62 |
| 8.93 | 2.48 | 60 | 108.2 | 63 |
| 7.02 | 1.95 | 75 | 109.2 | 64 |
| 6.30 | 1.75 | 77 | 108.5 | 65 |
| 5.44 | 1.51 | 81 | 107.2 | 64 |
| 4.50 | 1.25 | 80 | 106.6 | 64 |
| 4.28 | 1.19 | 84 | 104.6 | 63 |
| 4.10 | 1.14 | 86 | 101.2 | 60 |
| 3.6 (Wet blasting is not carried out) | 1.00 | 40 | 100 | 58 |

In Table 3, the column showing the case in which the capacitance of aluminum foil 21 is 3.6 μF/cm$^2$ shows results of the case using raw aluminum foil 1 that has not been subjected to wet blasting treatment (comparative Example). Note here that the area enlargement ratio is represented by the ratio of the capacitance of aluminum foil 21 relative to the capacitance of this comparative example.

As is apparent from Table 3, by allowing oxide particles to collide with raw aluminum foil 1, the capacitance of aluminum foil 21 becomes 1.19 times or more as that of raw aluminum foil 1 before roll-pressed mark 1A is eliminated. Thereby, the capacitance of the forming treated foil is improved by 3.2 to 9.2%. Furthermore, the bending strength is equal to or more than that of the comparative example.

It is preferable that wet blasting treatment is carried out so that the area enlargement ratio is 1.19 times or more and 4.3 times or less. In the wet blasting treatment, by allowing oxide particles to collide with raw aluminum foil 1, recesses 6 are physically formed on the surface and the surface area is increased. However, when the area enlargement ratio is more than 4.3 times, the ratio of overlapping of physical recesses 6 is increased, so that the effect of improving the capacitance of the forming treated foil is reduced.

Furthermore, as is apparent from Table 3, it is preferable that by collision of oxide particles, the capacitance of aluminum foil 21 is made to be 4.28 μF/cm$^2$ or more. Thus, the capacitance of the forming treated foil can be improved by 3.2 to 9.2% as compared with the comparative example. Furthermore, the bending strength becomes equal to or more than that of the comparative example.

Furthermore, it is preferable that the capacitance of aluminum foil 21 is 15.48 µF/cm$^2$ or less. The reason for this is the same as in the case in which the area enlargement ratio is made to be 4.3 times or less.

As mentioned above, it is preferable that the area enlargement ratio by wet blasting treatment is 1.19 times or more and 4.3 times or less, and that the capacitance of aluminum foil 21 is 4.28 µF/cm$^2$ or more and 15.48 µF/cm$^2$ or less. Thus, the effective surface area in which pits of aluminum foil 21 are generated is enlarged, and furthermore, the dispersibility of pits can be improved. As a result, the capacitance of the anode foil can be increased.

The surface of aluminum foil 21 on which a large number of recesses 6 are present has a less lustrous surface than the surface before roll-pressed mark 1A is eliminated, and the colorimetric value (L-value) is high as compared with the surface before roll-pressed mark 1A is eliminated. The colorimetric value (L-value) also greatly affects the etching treatment of aluminum foil 21. Next, detailed study results focused on the L-value is described.

(Study of L-value of Hunter Lab Color System)

As raw aluminum foil 1, the above-mentioned anode foil for an aluminum electrolytic capacitor (for high voltage) is used. Also in this study, a material having a thickness of 105 µm is used. By allowing oxide particles to collide with raw aluminum foil 1, ten types of aluminum foil 21 having different colorimetric values (L-values of Hunter Lab color system) of the surface of 50, 55, 60, 65, 70, 75, 80, and 85, respectively. At this time, the oxide particle to be used is the above-mentioned White Alundum (size: #2000). The mixture ratio by weight of the oxide particles and water is made to be 50/50. By adjusting the conditions of collision (distance L and spraying pressure) of oxide particles, the colorimetric value of aluminum foil 21 of each sample is changed.

The thus produced aluminum foil 21 is further subjected to etching treatment and forming treatment. The conditions are the same as those mentioned above. Note here that etching treatment and forming treatment are also carried out to raw aluminum foil 1 that has not been subjected to wet blasting treatment.

The capacitance ratio and the bending strength of the thus produced forming treated foil, as well as L-value of Hunter Lab color system of aluminum foil 21 before etching, and the Vickers hardness thereof measured by the well-known method are shown in Table 4. The measurement methods of the capacitance, the bending strength and the colorimetric values are the same as those mentioned above.

TABLE 4

| State of aluminum foil | | Properties of forming treated foil | |
|---|---|---|---|
| L value | Vickers hardness (HV) | Capacitance ratio | bending strength (number of times) |
| 50 | 20 | 101 | 60 |
| 55 | 20 | 102 | 61 |
| 60 | 21 | 103 | 62 |
| 65 | 24 | 106 | 63 |
| 70 | 25 | 108 | 62 |
| 75 | 26 | 110 | 62 |
| 80 | 28 | 109 | 61 |
| 85 | 29 | 104 | 59 |
| 40 | 19 | 100 | 60 |

In Table 4, the column showing the case in which the colorimetric value (L-value) of the surface of aluminum foil 21 is 40 shows results of the case using raw aluminum foil 1 that has not been subjected to wet blasting treatment is used (comparative example).

As is apparent from Table 4, in the case in which the colorimetric value (L-value) of the surface of aluminum foil 21 is 65 or more and 80 or less, the capacitance is improved by 6 to 10% as compared with the comparative example and the bending strength is substantially equal to that of the comparative example.

On the contrary, when the colorimetric value (L-value) is less than 65, the capacitance is not different so largely as compared with the comparative example. Furthermore, although the results are not shown, when the colorimetric value (L-value) is more than 85, the surface hardness of the aluminum foil is increased, and the capacitance cannot be increased.

From the above-mentioned results, it is preferable that the wet blasting treatment is carried out so that the colorimetric value (L-value) of the surface of aluminum foil 21 is higher than the colorimetric value (L-value) of the surface of raw aluminum foil 1 before roll-pressed mark 1A is eliminated. The results shown in Table 3 show that when the wet blasting treatment is carried out so that the L-value is 49 or more and 86 or less, the capacitance after etching treatment can be increased. Furthermore, the results shown in Table 4 show that it is further preferable that the L-value is 65 or more and 80 or less.

As mentioned above, according to the present invention, aluminum foil for middle to high voltage suitable for improving the pit density and improving the pit dispersibility can be produced. Thus, electrode foil for an aluminum electrolytic capacitor, in which the capacitance of electrode foil for middle to high voltage can be improved and which has a high mechanical strength of electrode foil, can be manufactured. As a result, in the aluminum electrolytic capacitor using the electrode foil, the rated capacitance can be increased and the withstanding voltage can be enhanced. Then, it can contribute to reducing the size of the electronic apparatus, enhancing the reliability, and increasing the voltage.

What is claimed is:

1. A method for manufacturing aluminum foil for an aluminum electrolytic capacitor, the method comprising:
winding off raw aluminum foil having a roll-pressed mark; and
allowing the raw aluminum foil to travel, and spraying a fluid dispersion obtained by mixing oxide particles and water to the raw aluminum foil from a direction opposite to a traveling direction of the raw aluminum foil so as to eliminate the roll-pressed mark on the raw aluminum foil and to form pyramidal-shaped recesses, each having an acute angle tip, all over a surface of the raw aluminum foil.

2. The method according to claim 1,
wherein each of the oxide particles has a polyhedral shape having an acute angle.

3. The method according to claim 2,
wherein the fluid dispersion obtained by mixing oxide particles and water is obliquely sprayed to the surface of the raw aluminum foil.

4. The method according to claim 1,
wherein the recess is formed in a part at a depth of up to 15 µF from the surface of the aluminum foil.

5. The method according to claim 1,
wherein a tensile force is applied to the raw aluminum foil while allowing the raw aluminum foil to travel.

6. The method according to claim 1,
wherein the raw aluminum foil is allowed to travel along a travelling roller, and
the fluid dispersion obtained by mixing the oxide particles and water is sprayed to a portion immediately below from an upstream side of traveling with respect to a vertical center line of the travelling roller.

7. The method according to claim 1, wherein a colorimetric value of the surface of the aluminum foil is enhanced as compared with a colorimetric value of the surface of the raw aluminum foil.

8. The method for according to claim 1, wherein a hardness of the surface of the aluminum foil is enhanced as compared with a hardness of a surface of the raw aluminum foil.

9. The method according to claim 1, wherein a capacitance of the aluminum foil is made to be 1.19 times or more as a capacitance of the raw aluminum foil.

10. A method for manufacturing electrode foil for an aluminum electrolytic capacitor, the method comprising:
   winding off raw aluminum foil having a roll-pressed mark;
   allowing the raw aluminum foil to travel, and spraying a fluid dispersion obtained by mixing oxide particles and water to the raw aluminum foil from a direction opposite to a traveling direction of the raw aluminum foil so as to eliminate the roll-pressed mark on the raw aluminum foil and to form pyramidal-shaped recesses, each having an acute angle tip, all over a surface of the raw aluminum foil, thereby producing aluminum foil for an aluminum electrolytic capacitor,
   carrying out direct-current etching treatment on the aluminum foil for an aluminum electrolytic capacitor, and
   carrying out forming treatment after the direct-current etching treatment.

\* \* \* \* \*